US008412261B2

(12) United States Patent
Yi

(10) Patent No.: US 8,412,261 B2
(45) Date of Patent: Apr. 2, 2013

(54) COUPLING APPARATUS FOR DIVIDING RECEIVING AND TRANSMITTING SIGNALS AND CONTROL METHOD THEREOF

(75) Inventor: Jinsung Yi, Daejoon (KR)

(73) Assignee: Phychips Inc. (KR)

( * ) Notice: Subject to any disclaimer, the term of this patent is extended or adjusted under 35 U.S.C. 154(b) by 733 days.

(21) Appl. No.: 12/614,083

(22) Filed: Nov. 6, 2009

(65) Prior Publication Data

US 2011/0053525 A1   Mar. 3, 2011

(30) Foreign Application Priority Data

Sep. 1, 2009 (KR) .......................... 10-2009-0081805

(51) Int. Cl.
*H04B 1/44* (2006.01)
*H04B 1/38* (2006.01)
*H04M 1/00* (2006.01)
*H04L 5/16* (2006.01)
*H04Q 5/22* (2006.01)
*G08C 19/12* (2006.01)

(52) U.S. Cl. ......... 455/550.1; 455/78; 455/83; 375/219; 340/10.4; 340/13.26

(58) Field of Classification Search .................... 455/73, 455/77, 78, 82, 83, 88, 550.1; 375/219; 340/10.4, 340/13.26

See application file for complete search history.

(56) References Cited

U.S. PATENT DOCUMENTS

| 4,028,645 | A | * | 6/1977 | Tressa .......................... 333/17.3 |
| 4,963,945 | A | * | 10/1990 | Cooper et al. ................. 455/307 |
| 5,815,803 | A | * | 9/1998 | Ho et al. ........................ 455/78 |
| 5,909,153 | A | * | 6/1999 | Delano et al. ................ 332/107 |
| 6,111,452 | A | * | 8/2000 | Fazi et al. .................... 327/355 |
| 6,421,332 | B1 | * | 7/2002 | Son ............................... 370/335 |

(Continued)

FOREIGN PATENT DOCUMENTS

| JP | 1996122429 | 5/1996 |
| JP | 2000278173 | 3/2000 |
| WO | 2008103757 | 8/2008 |

*Primary Examiner* — Andrew Wendell
(74) *Attorney, Agent, or Firm* — The Belles Group, P.C.

(57) ABSTRACT

The present invention is directed to reducing leakage of a transmitting signal to a receiving unit in a wireless communication system with a transmitting unit and the receiving unit sharing an antenna. A coupling apparatus for dividing a radio frequency (RF) transmitting signal and an RF receiving signal in a transceiver with a transmitting unit and a receiving unit sharing an antenna, includes: a four-port circuit having port 1, port 2, port 3, and port 4, a through path being formed between the port 1 and the port 2, a first signal input to the port 1 being coupled to the port 4, a second signal input to the port 2 being coupled to the port 3, and an isolation path being formed between the port 1 and the port 4 and between the port 2 and the port 3; and an attenuator attenuating and outputting a signal output from the port 3 of the four-port circuit, and the RF transmitting signal is input to the port 1 of the four-port circuit, the RF receiving signal is input to the port 2 of the four-port circuit, and outputs of the attenuator and the port 4 of the four-port circuit are provided the receiving unit. Leakage of a transmitting signal of a transmitting unit to a receiving unit in a communication system sharing an antenna can be isolated. Furthermore, an isolation effect of a leakage signal of a transmitting unit to a receiving unit can be maximized while adaptively changing an attenuation value of a variable attenuator.

15 Claims, 17 Drawing Sheets

U.S. PATENT DOCUMENTS

| | | |
|---|---|---|
| 6,539,215 B1* | 3/2003 | Brankovic et al. ............ 455/323 |
| 8,005,451 B2* | 8/2011 | Kayano et al. ................ 455/286 |
| 2005/0170788 A1* | 8/2005 | Tanaka et al. .................. 455/73 |
| 2005/0221875 A1* | 10/2005 | Grossman et al. ......... 455/575.7 |
| 2006/0141976 A1* | 6/2006 | Rohde et al. ................. 455/326 |
| 2009/0253384 A1* | 10/2009 | Gorbachov .................... 455/83 |
| 2010/0060353 A1* | 3/2010 | Grebennikov et al. ....... 330/107 |
| 2010/0255805 A1* | 10/2010 | Chandler et al. ............. 455/272 |
| 2011/0032854 A1* | 2/2011 | Carney et al. ................ 370/294 |

* cited by examiner

COUPLING APPARATUS FOR DIVIDING RECEIVING AND TRANSMITTING SIGNALS AND CONTROL METHOD THEREOF

CROSS-REFERENCE TO RELATED PATENT APPLICATIONS

The present application claims priority under 35 U.S.C. §119 to Korean Patent Application Serial Number 10-2009-0081805, filed Sep. 1, 2009, the entirety of which is hereby incorporated by reference.

FIELD OF THE INVENTION

The present invention relates to wireless communication, and more particularly to technology capable of reducing leakage of a transmitting signal to a receiving unit in a wireless communication system with a transmitting unit and the receiving unit sharing an antenna.

BACKGROUND OF THE INVENTION

One example of a communication system for transmitting and receiving signals is a radio frequency identification (RFID) system. RFID is technology that automatically recognizes data stored in a tag, a label, or a card with a microchip using radio frequency by a reader.

RFID technology causes an RFID reader to read an RFID tag information. In a case of a passive RFID tag, there is no a need for a separate power supply, such as a battery, outside of the RFID tag for driving the RFID tag. An external RF continuous wave (RF CW) should be continuously supplied to the RFID tag such that the RFID tag may produce a power source to be driven thereby. However, when a passive RFID reader reads a signal generated from the RFID tag, it should continuously generate and transfer an RF CW signal to the RFID tag. In this case, since the transmitting signal is mixed with a signal generated by the RFID tag being transferred to the RFID reader (i.e., the mixed signal is received by the RFID reader), it is difficult to identify an RFID tag signal. In a case where only one antenna is used, because an intensity of a transmitting signal is much larger than that of a receiving signal in the RFID reader, leakage of a transmitting signal from a transmitting unit to a receiving unit cannot be isolated. The leakage of the transmitting signal to the receiving unit deteriorates the performance of the receiving signal.

FIG. 1 is a view illustrating a conventional apparatus 100 for isolating a leakage signal 150 of a transmitting signal from a signal input to a receiving unit 130 using an antenna 140 transmitting and receiving an RF signal, a transmitting unit 120 converting the signal into an RF transmitting signal $TX_1$, a receiving unit 130 receiving and converting an output of port 2 into a baseband signal, and a circulator 110. The circulator 110 has a characteristic wherein it transfers a signal from port 1 to port 2, from port 2 to port 3, and from port 3 to port 1, but does not transfer the signal from port 2 to port 1, from port 1 to port 3, and from port 3 to port 2, which are directions opposite to correct operation. That is why the circulator 110 has non-reciprocity due to a strong magnetic field. The apparatus 100 may isolate a signal 150 leaked to the receiving unit 130 from the transmitting unit 120 using the non-reciprocity. In this manner, an isolation performance of approximately 25 dB may be obtained. However, when a frequency less than 1 GHz is used in the apparatus 100, for example, when a used frequency ranges from 860 MHz to 960 MHz, the apparatus 100 has a demerit that a circulator is very large and its cost is high.

FIG. 2 is a view illustrating a conventional apparatus 200 for isolating a leakage signal of a transmitting signal output from a transmitting unit 120 from a signal input to a receiving unit 130 using one antenna 140 transmitting and receiving an RF signal and a directional coupler 210. The directional coupler 210 of FIG. 2 has a signal through path in port 1→port 2 direction, a signal isolation path in port 1→port 3 direction, and a signal coupling path by coupling in port 1→port 4 direction. Further, each port has reciprocity with respect to remaining ports. The relationship between port 1 and port 3 becomes an isolation path to isolate a transfer of a transmitting signal $TX_1$ of the transmitting unit 120 to port 3 connected to the receiving unit 130 but a part of the transmitting signal $TX_1$ is leaked to become a leakage signal $TX_3$, which is output to the receiving unit 130. In this case, an isolation performance of approximately 25 dB may be obtained.

As described above, the two apparatuses 100 and 200 are generally used in an RFID system to divide a transmitting signal $TX_1$ and a receiving signal $RX_2$. In the two cases, a leakage of a transmitting signal from a transmitting unit to a receiving unit cannot be completely isolated. The larger an intensity of the transmitting signal is, the larger an intensity of the leakage signal is.

FIG. 3 is a view illustrating an apparatus 300 for improving an isolation performance of a transmitting signal using one antenna 140, two directional couplers 210, a balanced oscillator 320, and a Wilkinson power combiner 330. The balanced oscillator 320 provide a signal having the same phase as that of a transmitting signal to one directional coupler 210 and a differential signal having a 180° phase difference from the transmitting signal to another directional coupler 210. The differential signal is canceled out in the Wilkinson power combiner 330 to remove the transmitting signal received through the antenna 140, with the result that only a desired receiving signal can be separated. However, the apparatus 300 uses a half of the transmitting signal for transmission and a remaining half thereof to cancel a signal leaked to the receiving unit 130. Consequently, transmission power consumption occurs.

FIG. 4 is a view illustrating a circuit for making a signal with a 180° phase difference from a transmitting signal using a vector modulator 430 to remove the transmitting signal. A part of the transmitting signal 471 is transferred to the vector modulator 430 through a first directional coupler 210 connected to the transmitting unit 120. The vector modulator 430 generates a cancellation signal 490 with the same magnitude as a magnitude and a phase different from a phase of the transmitting signal leaked from the circulator 110, and provides the cancellation signal 490 to the second directional coupler 210. Upon reception of the cancellation signal 490, the second directional coupler 210 sums the cancellation signal 490, the receiving signal 460 received through an antenna 140, and the leaked transmitting signal 450, thereby removing the leaked transmitting signal 450. In this manner, since a cancellation signal 490 with the same magnitude as a magnitude of the leaked transmitting signal 450 and a phase different from a phase of the leaked transmitting signal 450 is generated, a vector modulator 430 should be implemented correctly, which is difficult and complicated.

SUMMARY OF THE INVENTION

The present invention has been made in view of the above problems, and it is an object of the present invention to provide a coupling apparatus capable of isolating leakage of a transmitting signal of a transmitting unit to a receiving unit in a communication system sharing an antenna, and a transceiver using the same.

It is another object of the present invention to provide a coupling apparatus and an attenuation value control method that may maximize an isolation effect of a leakage signal of a transmitting unit to a receiving unit while adaptively changing an attenuation value of a variable attenuator.

In accordance with an exemplary embodiment of the present invention, there is provided a coupling apparatus for dividing a radio frequency (RF) transmitting signal and an RF receiving signal in a transceiver with a transmitting unit and a receiving unit sharing an antenna, comprising: a four-port circuit having port 1, port 2, port 3, and port 4, a through path being formed between the port 1 and the port 2, a first signal input to the port 1 being coupled to the port 4, a second signal input to the port 2 being coupled to the port 3, wherein the port 1 and the port 4 are isolated, and the port 2 and the port 3 are isolated; and an attenuator attenuating and outputting a signal output from the port 3 of the four-port circuit, wherein the RF transmitting signal is input to the port 1 of the four-port circuit, the RF receiving signal is input to the port 2 of the four-port circuit, and outputs of the attenuator and the port 4 of the four-port circuit are provided the receiving unit.

Preferably, the coupling apparatus further comprises a subtracter subtracting an output signal of the attenuator from an output signal of the port 4, and an output of the subtracter is provided to the receiving unit.

More preferably, the attenuator is a variable attenuator operable to control variably an attenuation value.

Most preferably, the four-port circuit is a directional coupler or a high frequency transformer.

In accordance with another aspect of the present invention, there is provided a transceiver comprising a transmitting unit, a receiving unit, and a coupling apparatus, wherein the attenuator is a variable attenuator operable to control variably an attenuation value, and the receiving unit includes: a low-noise amplifier subtracting and amplifying an output signal of the attenuator from an output signal of the four-port circuit; a received signal strength indicator (RSSI) measuring unit measuring an RSSI of a transmission leakage signal based on an output of the low-noise amplifier; and a control unit controlling an attenuation value of the attenuator based on the measured RSSI.

Preferably, the transceiver further comprises an antenna connected to the port 2 of the coupling apparatus.

In accordance with a further aspect of the present invention, there is provided a transceiver comprising a transmitting unit, a receiving unit, and a coupling apparatus, wherein the attenuator is a variable attenuator variably controlling an attenuation value, and the receiving unit includes: a low-noise amplifier subtracting and amplifying an output signal of the attenuator from an output signal of the four-port circuit; a mixer down-converting an output signal of the low-noise amplifier; a low pass filter passing low frequency components included in an output of the mixer; a received signal strength indicator (RSSI) measuring unit measuring an RSSI of a transmission leakage signal based on an output of the low pass filter; and a control unit controlling an attenuation value of the attenuator based on the measured RSSI.

Preferably, the transceiver further comprises an antenna connected to the port 2 of the coupling apparatus.

More preferably, the four-port circuit is a directional coupler or a high frequency transformer.

In accordance with a yet aspect of the present invention, there is provided a method for controlling the attenuation value of the variable attenuator by the controller of the transceiver, comprising the steps of: setting the attenuation value of the variable attenuator to a preset minimum value; subtracting an output of the variable attenuator from an output of the port 3 by a subtracter when an RF signal is received and an output signal of the port 4 is input to the variable attenuator; measuring an RSSI of a transmission leakage signal based on an output of the subtracter; sequentially increasing an attenuation value of the variable attenuator to measure the RSSIs; and setting the attenuation value achieved when the lowest RSSI among the measured RSSI values is measured set as the attenuation value of the variable attenuator.

In the present invention, leakage of a transmitting signal of a transmitting unit to a receiving unit in a communication system sharing an antenna can be isolated.

Furthermore, in the present invention, an isolation effect of a leakage signal of a transmitting unit to a receiving unit can be maximized while adaptively changing an attenuation value of a variable attenuator.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail referring to the accompanying drawings.

Figure 5:
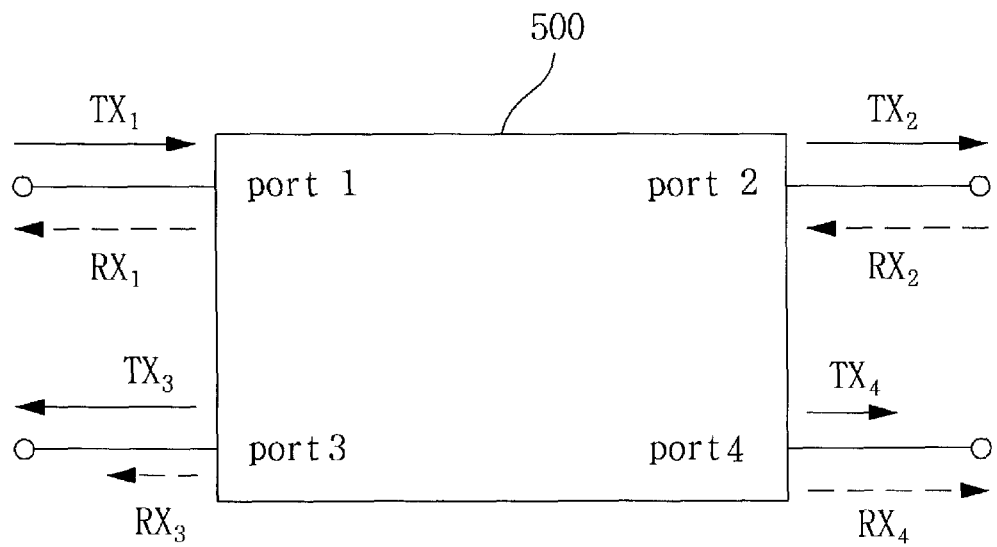
FIG. 5 is a view illustrating a four-port circuit in accordance with an embodiment of the present invention.

FIG. 5 is a view illustrating a four-port circuit 500 in accordance with an embodiment of the present invention. Referring to FIG. 5, the four-port circuit 500 includes four ports (port 1, port 2, port 3, and port 4). In relationship between respective ports, when a transmitting signal $TX_1$ is input to port 1, an attenuated signal $TX_2$ is output to port 2 due to insertion loss (equation 1). In this case, it is assumed that a through path is formed between port 1 and port 2. When the transmitting signal $TX_1$ is input to port 1, it is output to port 4 by coupling (equation 2). In this case, it is assumed that port 1 and port 4 are coupled with each other. A part of the transmitting signal $TX_1$ input to port 1 is output to port 3 due to leakage (equation 3). In this case, it is assumed that an isolation path is formed between port 1 and port 3. Further, the four-port circuit 500 of the present invention has reciprocity with respect to respective ports.

$$TX_2 = \frac{TX_1}{P_{insertion\ loss}} \quad (1)$$

$$TX_2 = \frac{TX_2}{P_{coupling}} \quad (2)$$

$$TX_3 = \frac{TX_1}{P_{isolation}} \quad (3)$$

Accordingly, when the receiving signal $RX_2$ is applied to port 2, a signal $RX_1$ attenuated by insertion loss is output through port 1 (equation 4), a coupling signal $RX_3$ is output through port 3 (equation 5), and a leakage signal $RX_4$ is output through port 4 (equation 6).

$$RX_2 = \frac{RX_2}{P_{insertion\ loss}} \quad (4)$$

$$RX_3 = \frac{RX_2}{P_{coupling}} \quad (5)$$

$$RX_4 = \frac{RX_2}{P_{isolation}} \quad (6)$$

Figure 6:
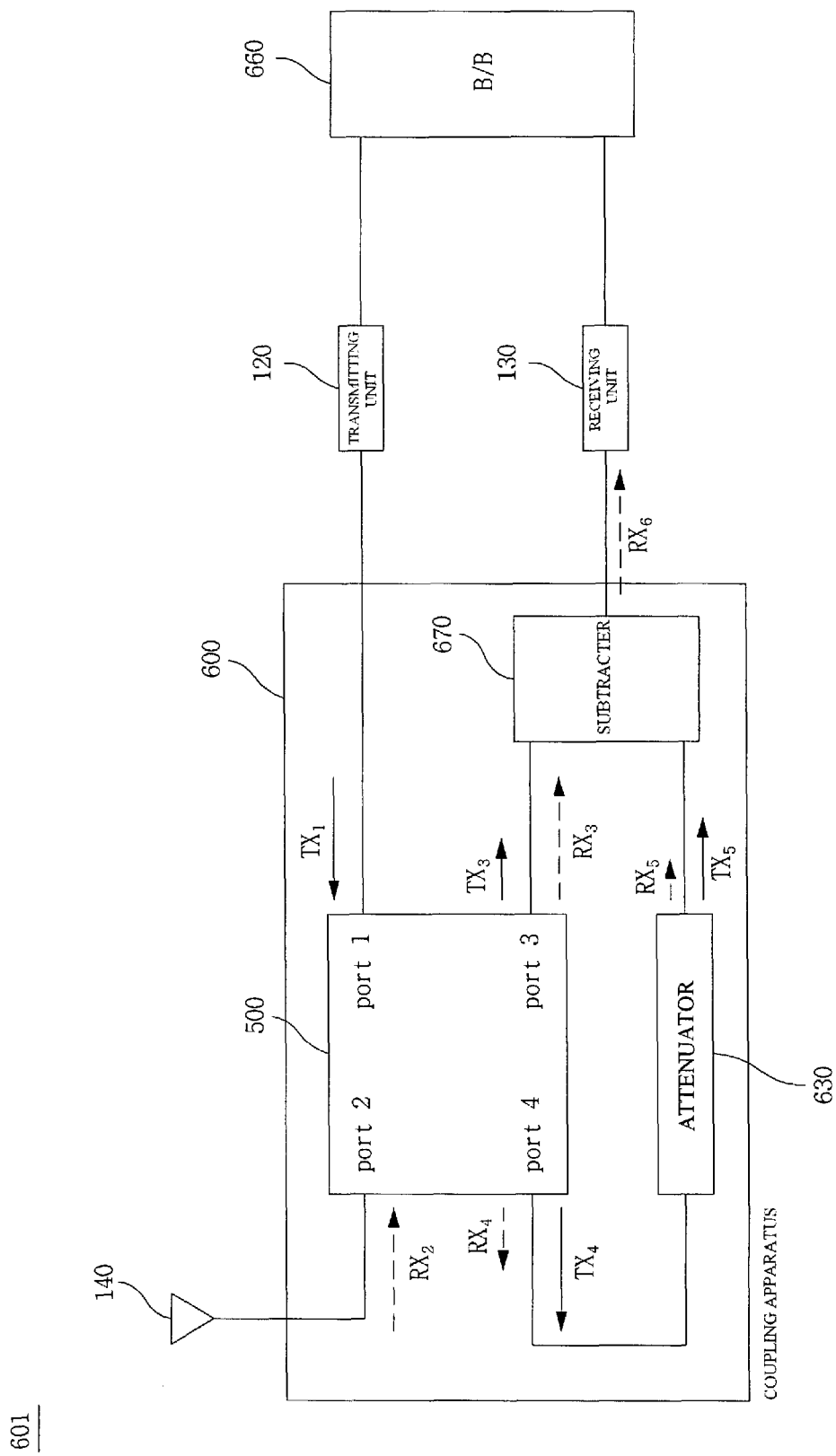
FIG. 6 is a block diagram illustrating an RF transceiver with a coupling apparatus in accordance with an embodiment of the present invention.

FIG. 6 is a block diagram illustrating an RF transceiver 601 with a coupling apparatus 600 in accordance with an embodiment of the present invention. Referring to FIG. 6, the RF transceiver 601 includes an antenna 140 transmitting and receiving an RF signal, a transmitting unit 120 converting a baseband signal into an RF transmission signal $TX_1$, a coupling apparatus 600, a receiving unit 130 receiving an output of the coupling apparatus 600 as an input signal and converting it into the baseband signal, and a baseband unit 660 processing the baseband signal. The coupling apparatus 600 includes an attenuator 630, a four-port circuit 500, and a subtracter 670.

The relationship between four ports of the four-port circuit 500 is identical with that described with reference to FIG. 5. A transmitting signal $TX_1$ transferred to the transmitting unit 120 is input to port 1. A signal $TX_4$ coupled with the transmitting signal $TX_1$ is output through port 4 together with a receiving signal $RX_4$ introduced through an antenna 140 (equation 7).

$$P_4 = \frac{TX_1}{P_{coupling}} + \frac{RX_2}{P_{isolation}} \quad (7)$$

A signal $RX_3$ coupled with the receiving signal $RX_2$ introduced into a port 2 through the antenna 140 is output through a port 3 together with a leakage signal $TX_3$ of the transmitting signal $TX_1$ input to port 1 (equation 8).

$$P_3 = \frac{RX_2}{P_{coupling}} + \frac{TX_1}{P_{isolation}} \quad (8)$$

The leakage signal $TX_3$ of the transmitting signal $TX_1$ output through the port 3 is $$\frac{TX_1}{P_{isolation}},$$

which is a second term of a right side in the equation (8). In a case of a direction coupler according to an embodiment of the present invention, $$\frac{TX_1}{P_{isolation}}$$

is about 25 dB.

If an attenuation value of an attenuator 630 connected to port 4 of the coupling apparatus 600 is set to $$\frac{P_{coupling}}{P_{isolation}}$$

, i.e, to a ratio of a coupling degree of the four-port circuit 500 to an isolation degree thereof, output signals $RX_5$ and $TX_5$ of the attenuator 630 can be expressed by a following equation 9.

$$\frac{P_{coupling}}{P_{isolation}} P_4 = \frac{TX_1}{P_{isolation}} + \frac{P_{coupling}}{P_{isolation}^2} RX_2 \quad (9)$$

The outputs $RX_5$ and $TX_5$ attenuated with the ratio of equation (9) and the output signals $TX_3$ and $RX_3$ in the port 3, are transferred to a subtracter 670 included in the coupling apparatus 600. The subtracter 670 subtracts the outputs $TX_5$ and $RX_5$ of the attenuator 630 from the output signals $TX_3$ and $RX_3$ in port 3, and outputs a subtracting result $RX_6$ to the receiving unit 130. The output $RX_6$ of the substractor 670 may be expressed by a following equation 10.

$$RX_6 = \frac{RX_2}{P_{coupling}} - \frac{P_{coupling}}{P_{isolation}^2} RX_2 \qquad (10)$$

As illustrated in the equation 10, the output $RX_6$, of the substractor 670 is constructed by only the receiving signal $RX_2$ component but the transmitting signal $TX_1$ component is removed therefrom. The leakage signal $TX_3$ of the transmitting signal $TX_1$ input from the transmitting unit 120 is removed and transferred to the receiving unit 130. In a case of a directional coupler according to an embodiment of the present invention, since there is a difference exceeding 10 dB between $P_{isolation}$ and $P_{coupling}$, a second term of a right side in the equation 10 may be enough smaller than a first term thereof to be disregarded.

Figure 1:
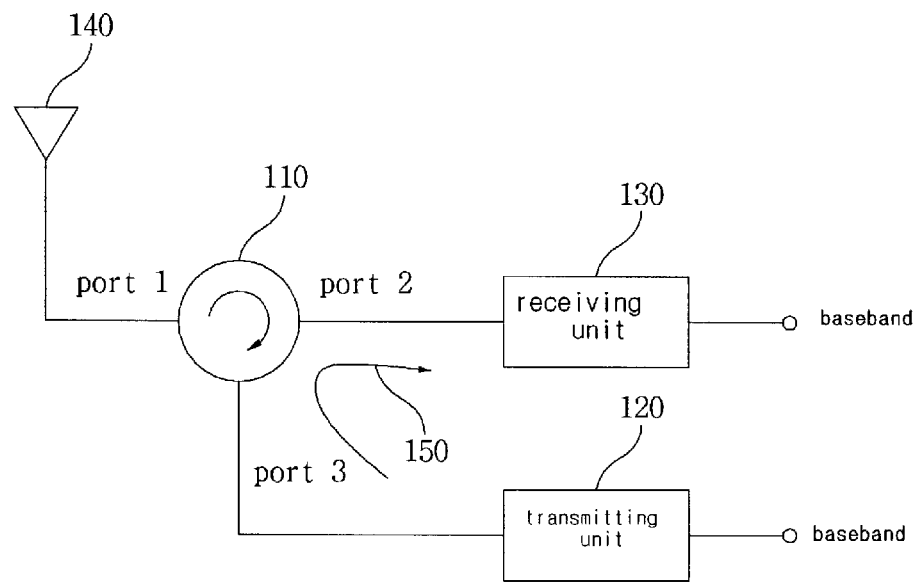
FIG. 1 is a view illustrating a conventional apparatus for isolating a leakage signal of a transmitting signal from a signal input to a receiving unit using a circulator.
Figure 2:
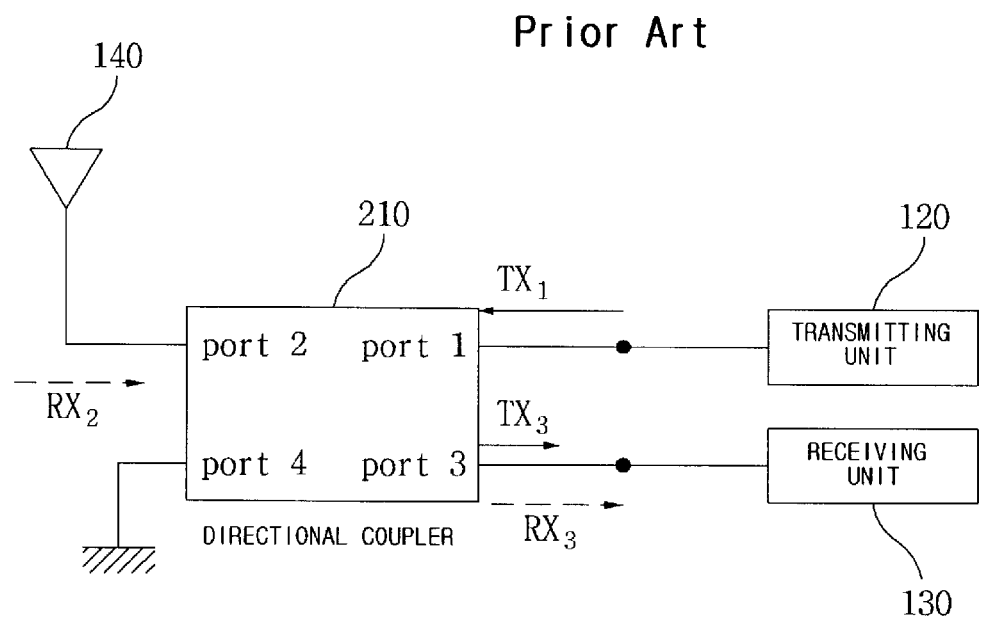
FIG. 2 is a view illustrating a conventional apparatus for isolating a leakage signal of a transmitting signal output from a transmitting unit from a signal input to a receiving unit using a directional coupler.
Figure 3:
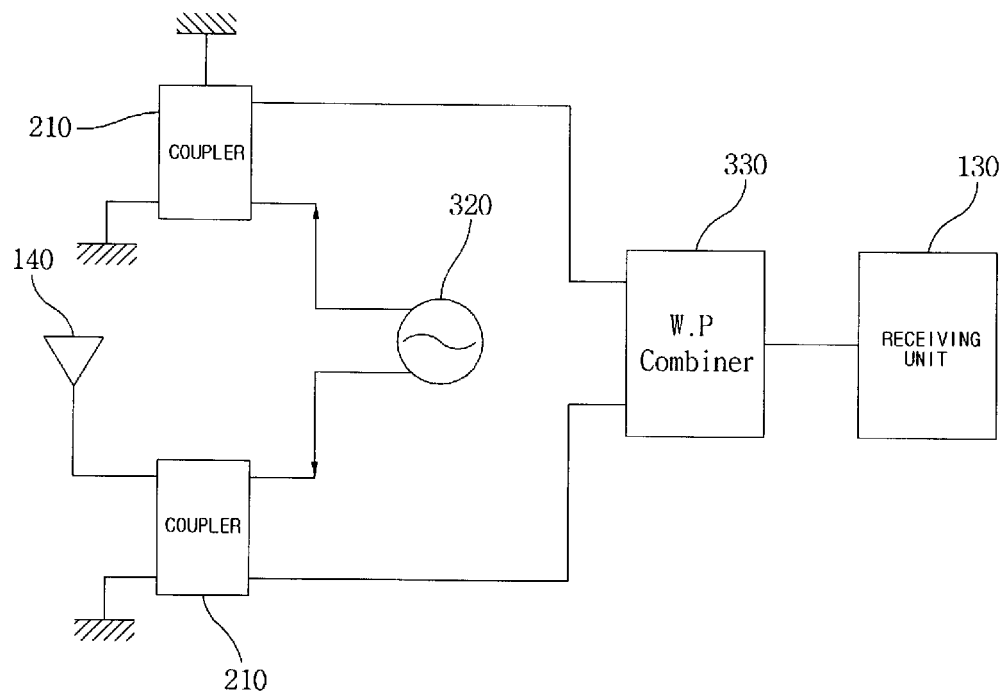
FIG. 3 is a view illustrating an apparatus for improving an isolation performance of a transmitting signal using an antenna, two directional couplers, a balanced oscillator, and a Wilkinson power combiner.
Figure 4:
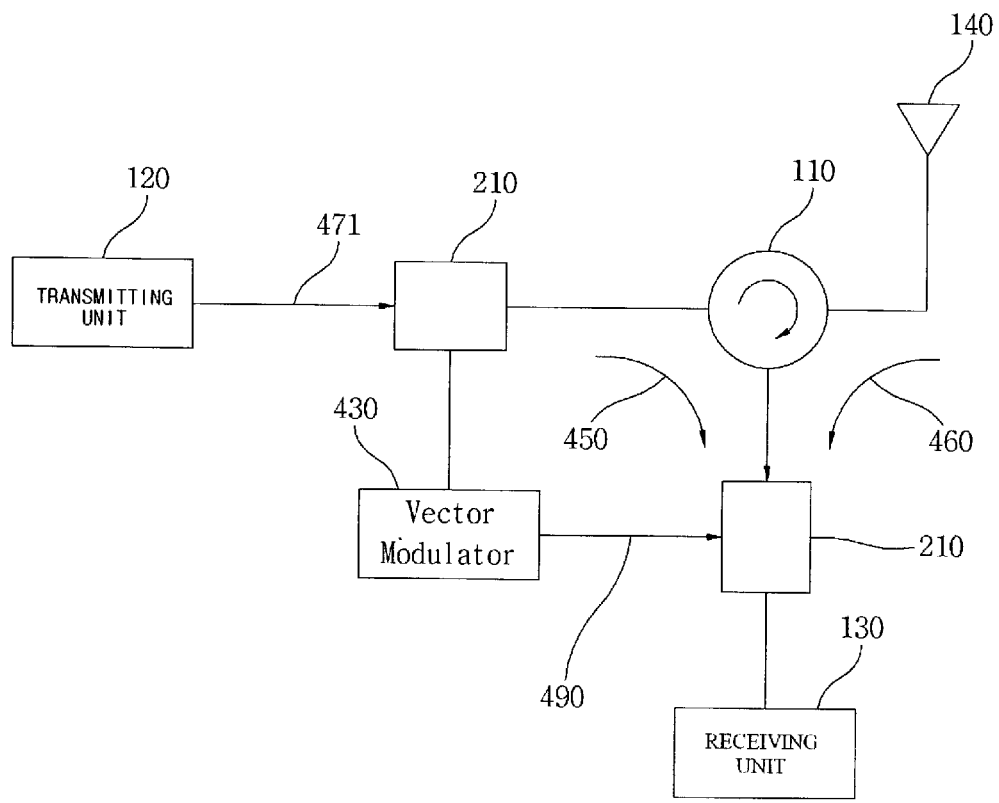
FIG. 4 is a view illustrating a circuit for making a signal with a phase difference from a transmitting signal using a vector modulator to remove the transmitting signal.

Upon comparing the present invention with a prior art shown in FIG. 2, unlike the signals $TX_3$ and $RX_3$ output through port 3 of a direction coupler 210 shown in FIG. 2 and transferred to the receiving unit 130, it is understood that the leakage signal $TX_3$ of the transmitting signal $TX_1$ input to port 1 is removed from the signal $RX_6$ transferred to the receiving unit 130 of the present invention shown in FIG. 6. Namely, an isolation characteristic of the transmitting signal is improved.

Figure 7:
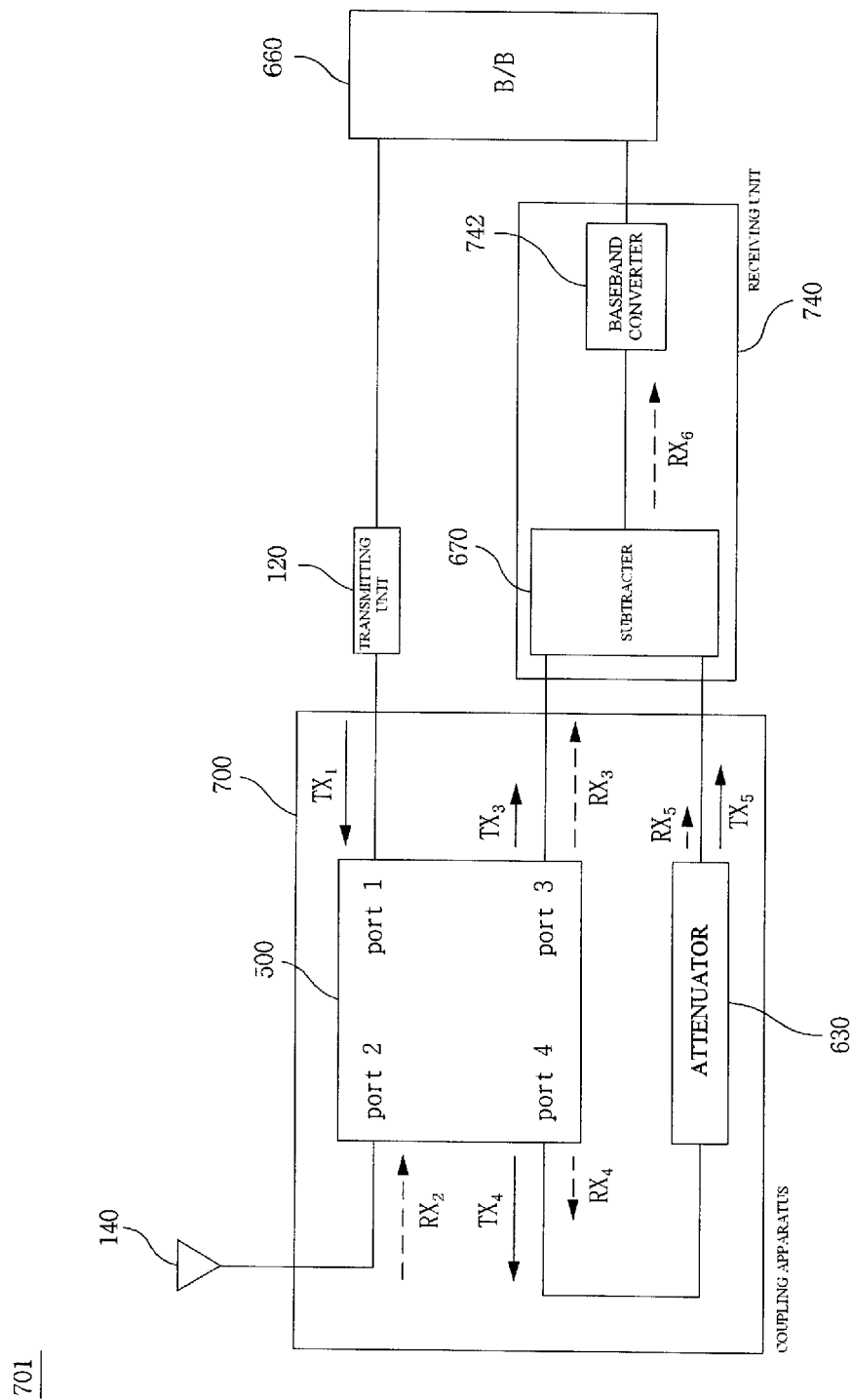
FIG. 7 is a block diagram illustrating an RF transceiver with a coupling apparatus in accordance with another embodiment of the present invention.

FIG. 7 is a block diagram illustrating an RF transceiver 701 with a coupling apparatus 700 in accordance with another embodiment of the present invention. Referring to FIG. 7, the RF receiving unit 701 includes: an antenna 140 transmitting and receiving an RF signal, a transmitting unit 120 converting a baseband signal into an RF transmitting signal $TX_1$, a coupling apparatus 700, a receiving unit 740 receiving an output of the coupling apparatus 700 as an input signal and performing a subtracting function to convert the input signal into the baseband signal, and a baseband unit 660 processing the baseband signal. The coupling apparatus 700 includes a four-port circuit 500 and an attenuator 630. The difference between the RF transceiver 601 of FIG. 6 and the RF transceiver 601 of FIG. 6 is that only the receiving unit 740 of FIG. 7 includes a subtracter 670.

If an attenuation value of an attenuator 630 is set to $$\frac{P_{coupling}}{P_{isolation}},$$

namely, to a ratio of a coupling degree of the four-port circuit 500 to an isolation degree thereof, output signals $RX_5$ and $TX_5$ of the attenuator 630 can be expressed by the foregoing equation 9. The attenuated outputs $RX_5$ and $TX_5$ and the output signals $TX_3$ and $RX_3$ in port 3 are transferred to the subtracter 670 included in the receiving unit 740. The subtracter 670 subtracts the outputs $TX_5$ and $RX_5$ of the attenuator 630 from the output signals $TX_3$ and $RX_3$ in port 3. The output $RX_6$ of the substractor 670 is expressed by the foregoing equation 10. The output $RX_6$ of the substractor 670 is converted into a baseband signal by a baseband converter 742 of the receiving unit 740, and then the baseband signal is provided to the baseband unit 660.

As appreciated from the equation 10, the transmitting signal $TX_1$ component is removed, and a signal $RX_6$ constructed by only the receiving signal $RX_2$ is transferred to the baseband converter 742. The leakage signal $TX_3$ of the transmitting signal $TX_1$ input to the transmitting unit 120 is removed and transferred to the baseband converter 742. In a case of a directional coupler according to an embodiment of the present invention, since there is a difference exceeding 10 dB between $P_{isolation}$ and $P_{coupling}$, a second term of a right side in the equation 10 may be enough smaller than a first term thereof to be disregarded.

Upon comparing the present invention with a prior art shown in FIG. 2, unlike the signals $TX_3$ and $RX_3$ output through port 3 of a direction coupler 210 shown in FIG. 2 and transferred to the receiving unit 130, it is understood that the leakage signal $TX_3$ of the transmitting signal $TX_1$ input to port 1 is removed from the signal $RX_6$ transferred to the baseband converter 742 of the present invention shown in FIG. 7. Namely, an isolation characteristic of the transmitting signal is improved.

Figure 8A:
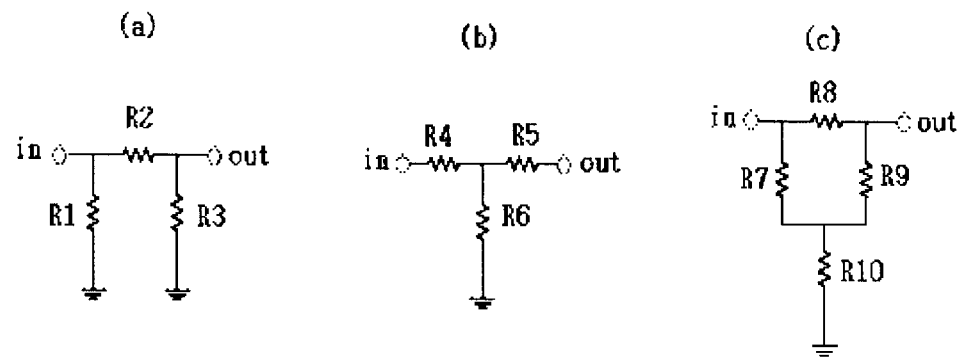
FIG. 8A is a view illustrating an attenuator in accordance with another embodiment of the present invention presented through resistors.

FIG. 8A is a view illustrating an attenuator 630 in accordance with another embodiment of the present invention presented through resistors. The attenuator 630 may be constructed by various conventional technologies. As an example, as shown in FIG. 8A, the attenuator 630 can be constructed by connections of resistors. (a), (b), and (c) of FIG. 8A indicate exemplary attenuators constructed using resistors R1~R10, respectively. The attenuators of FIG. 8A each include an input terminal in and an output terminal out. A signal input to the input terminal is attenuated by a resistance value of resistors connected between the input terminal and the output terminal, and the attenuated signal is output through the output terminal, so that a desired attenuation of the signal can be obtained. In addition to a circuit arrangement shown in FIG. 8A, a person of ordinary skill in the art may construct the attenuator using various known technologies.

Figure 8B:
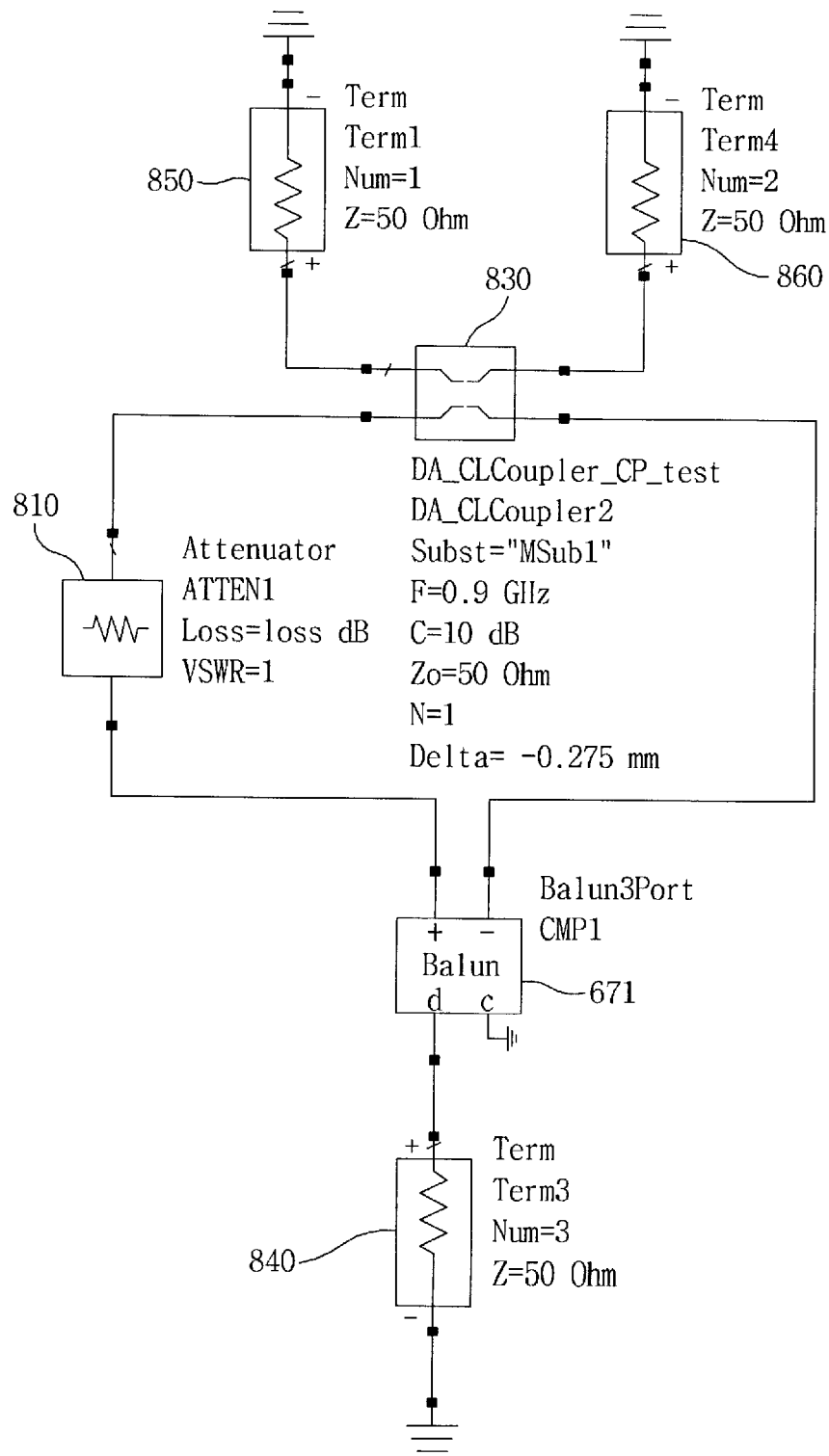
FIG. 8B is a view illustrating a circuit used to simulate the coupling apparatus shown in FIG. 6.

FIG. 8B is a view illustrating a circuit 800 used to simulate the coupling apparatus 600 shown in FIG. 6. A receiving unit 840, a transmitting unit 850, an antenna 860 of FIG. 8B corresponding to the receiving unit 130, the transmitting unit 120, and the antenna 140 of FIG. 6 are respectively constructed by a 50Ω resistor. The circuit 800 used for simulation includes an attenuator 630, a balun 671 as a substractor 670, and a directional coupler 210 as a four-port circuit 500. The directional coupler 210 is an ideal coupler that has a coupling degree of 10 dB and an isolation degree of 22 dB. It is assumed that there scarcely occurs a phase variation due to a difference of a phase because a general ceramic coupler with a permittivity of 10 is much smaller in a physical size as compared with that with a wavelength of 10.512 cm of 900 MHz band having a permittivity of 10.

Figure 9A:
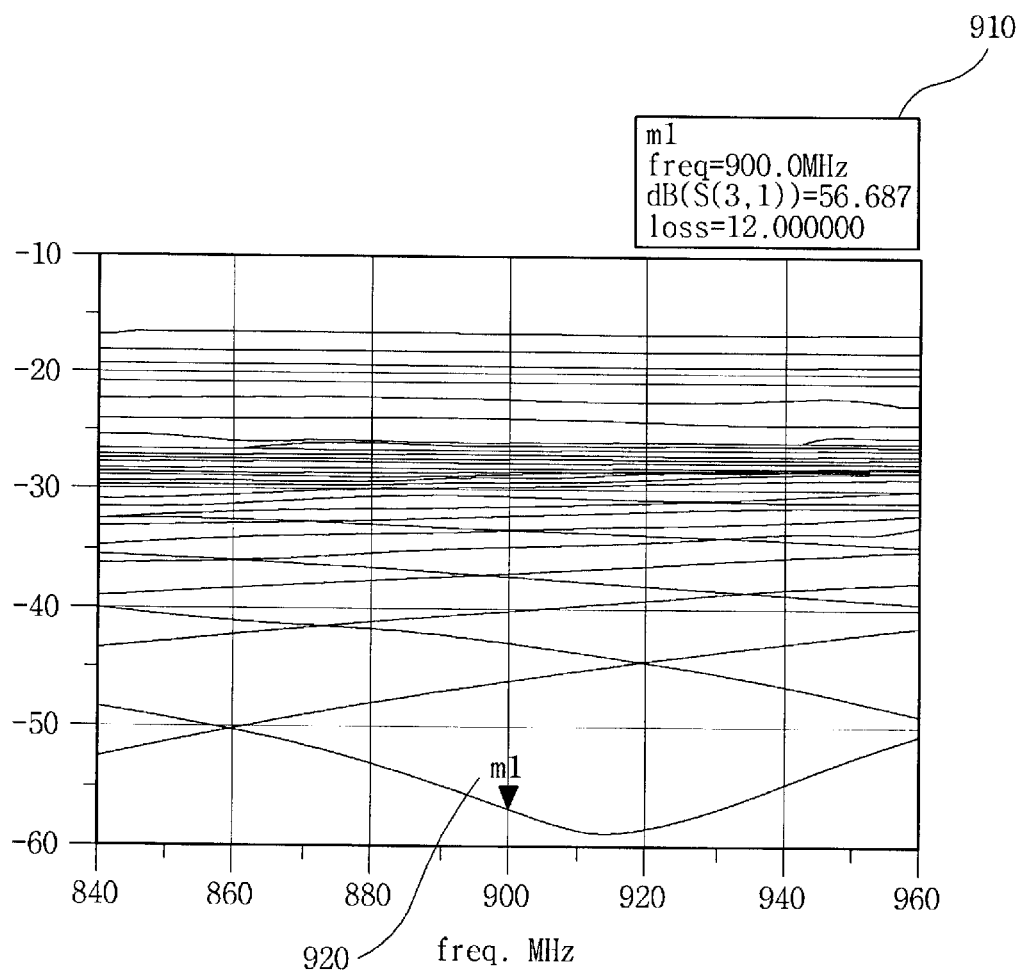
FIG. 9A is a graph illustrating a simulation result of an isolation characteristic in the circuit shown in FIG. 8B.

FIG. 9A is a graph illustrating a simulation result of an isolation characteristic in the circuit 800 shown in FIG. 8B, which indicates the change in the isolation characteristic according to an attenuation degree of the attenuator 630. When an attenuation value of the attenuator 630 is set to 12 dB being a difference between a coupling characteristic and an isolation characteristic (910), it may be appreciated that an isolation characteristic of the directional coupler 210 itself used in an experiment is 22 dB, but an isolation characteristic of the coupling apparatus 600 is enhanced as 56 dB (920).

Figure 9B:
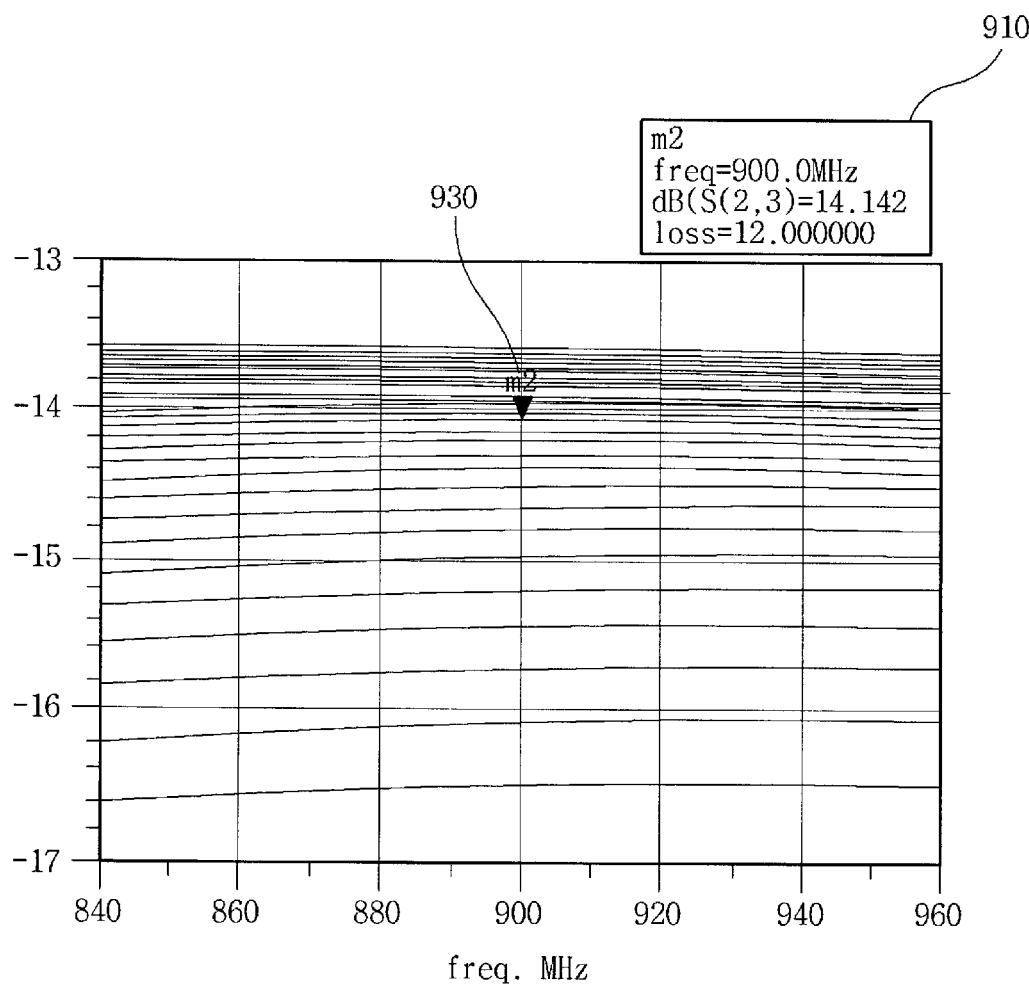
FIG. 9B is a graph illustrating a simulation result of a coupling characteristic in the circuit shown in FIG. 8B.

FIG. 9B is a graph illustrating a simulation result of a coupling characteristic in the circuit 800 shown in FIG. 8B, which indicates the change in the coupling characteristic according to the attenuation degree of the attenuator 630. When an attenuation value of the attenuator 630 is set to 12 dB being a difference between a coupling characteristic and an isolation characteristic (910), it may be appreciated that a coupling characteristic of the directional coupler 210 itself used in an experiment is 10 dB, but a coupling characteristic of the coupling apparatus 600 is deteriorated with a value of 14 dB (930).

However, because the isolation characteristic of the coupling apparatus 600 affects the performance of the RF transceiver 601 greater than the coupling characteristic thereof, a usage of the coupling apparatus 600 of the present invention can attain an effect of improving a receiving performance. A recognition distance of an RFID tag is measured by applying the RFID transceiver 601 to a product. As illustrated in an experimental result of a table 1, it is appreciated the recognition distance of an RFID tag is increased.

TABLE 1

|  | Output of transmitter | Recognition distance |
|---|---|---|
| Before application | 24 δBμ | 150 cm |
| After application | 24 δBμ | 100 cm |

Figure 10:
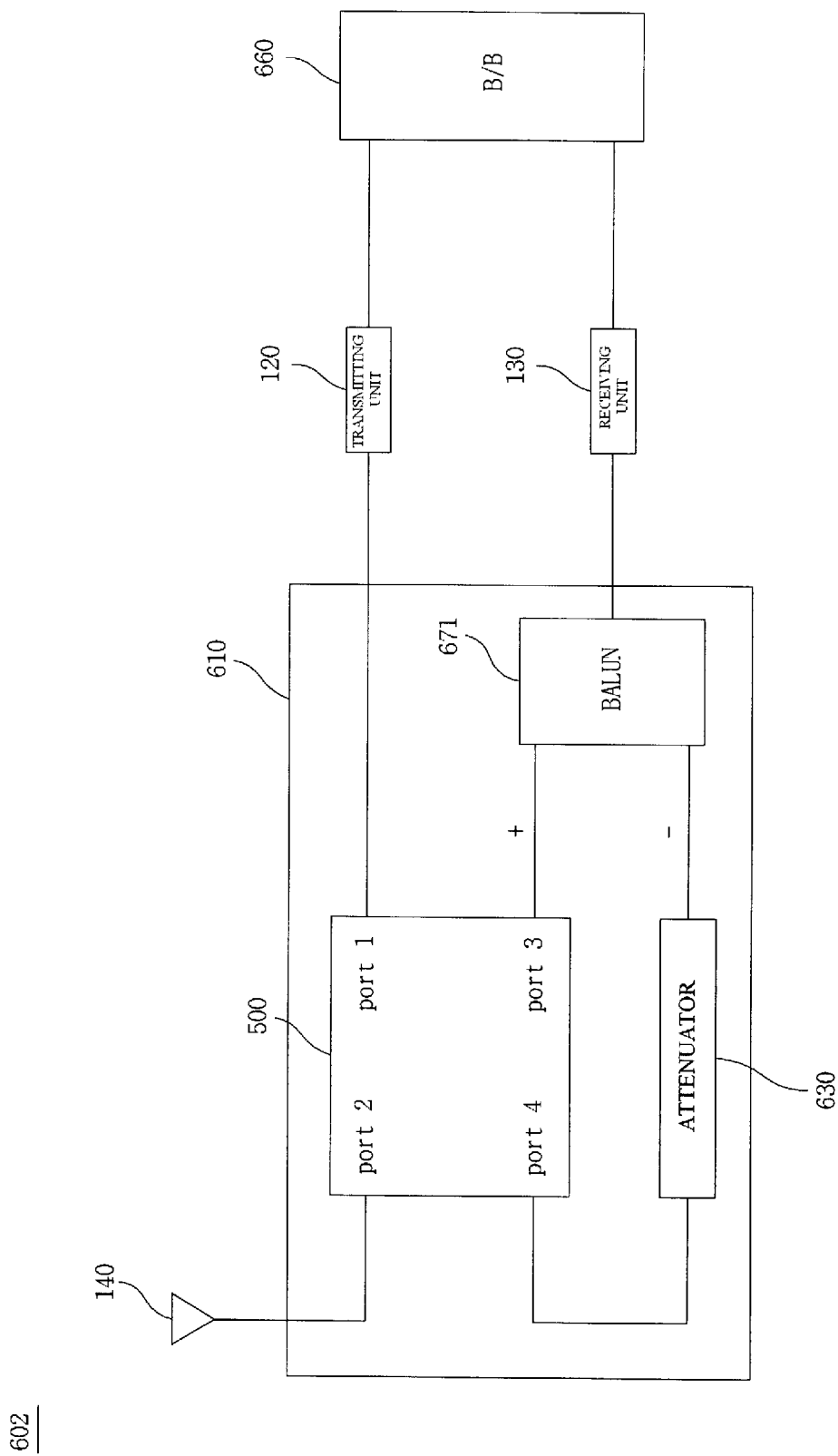
FIG. 10 is a block diagram illustrating an RF transmitting unit with a coupling apparatus which uses a balun as a subtracter for subtracting a signal in accordance with an embodiment of the present invention.
Figure 11:
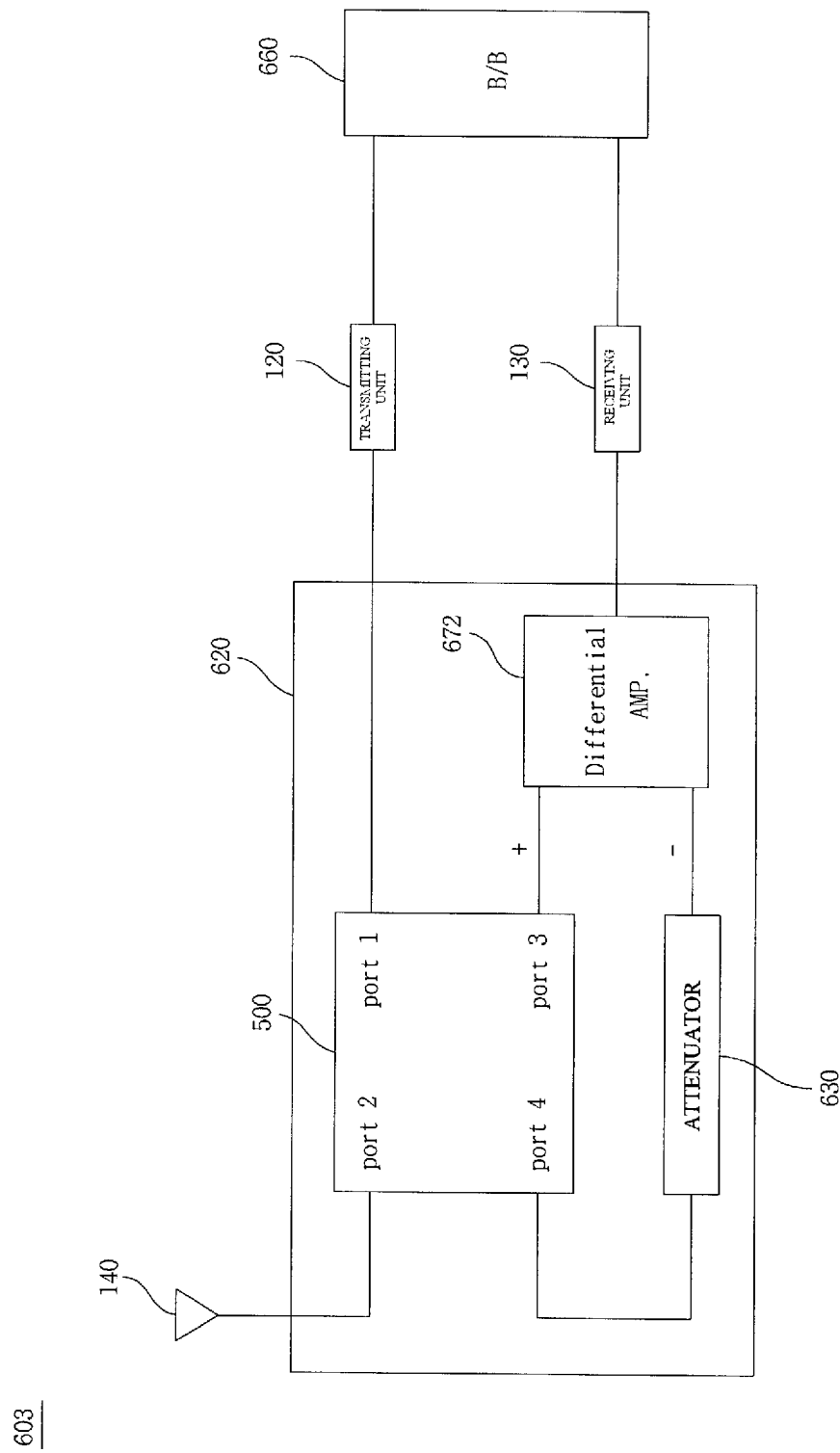
FIG. 11 is a block diagram illustrating an RF transmitting unit with a coupling apparatus which uses a differential amplifier as a subtracter for subtracting a signal in accordance with another embodiment of the present invention.

FIG. 10 is a block diagram illustrating an RF transmitting unit 602 with a coupling apparatus 610 in accordance with an embodiment of the present invention. FIG. 11 is a block diagram illustrating an RF transmitting unit 603 with a coupling apparatus 620 in accordance with another embodiment of the present invention. Each transceiver of FIG. 10 and FIG. 11 includes a coupling apparatus 610 or 620, an antenna 140, a four-port circuit 500, an attenuator 630, and a baseband unit 660 in common. The coupling apparatus 610 of FIG. 10 includes a balun 671 as the subtracter 670. The coupling apparatus 620 of FIG. 11 includes a differential amplifier 672 as the subtracter 670.

Persons of ordinary skill in the art may construct the subtracter 670 of FIG. 6 using various known technologies to implement various modified examples of the RF transceiver 601 of the present invention. Such modified examples are intended to belong to the scope of right of the present invention.

Modified Example of Embodiment 1

Figure 12:
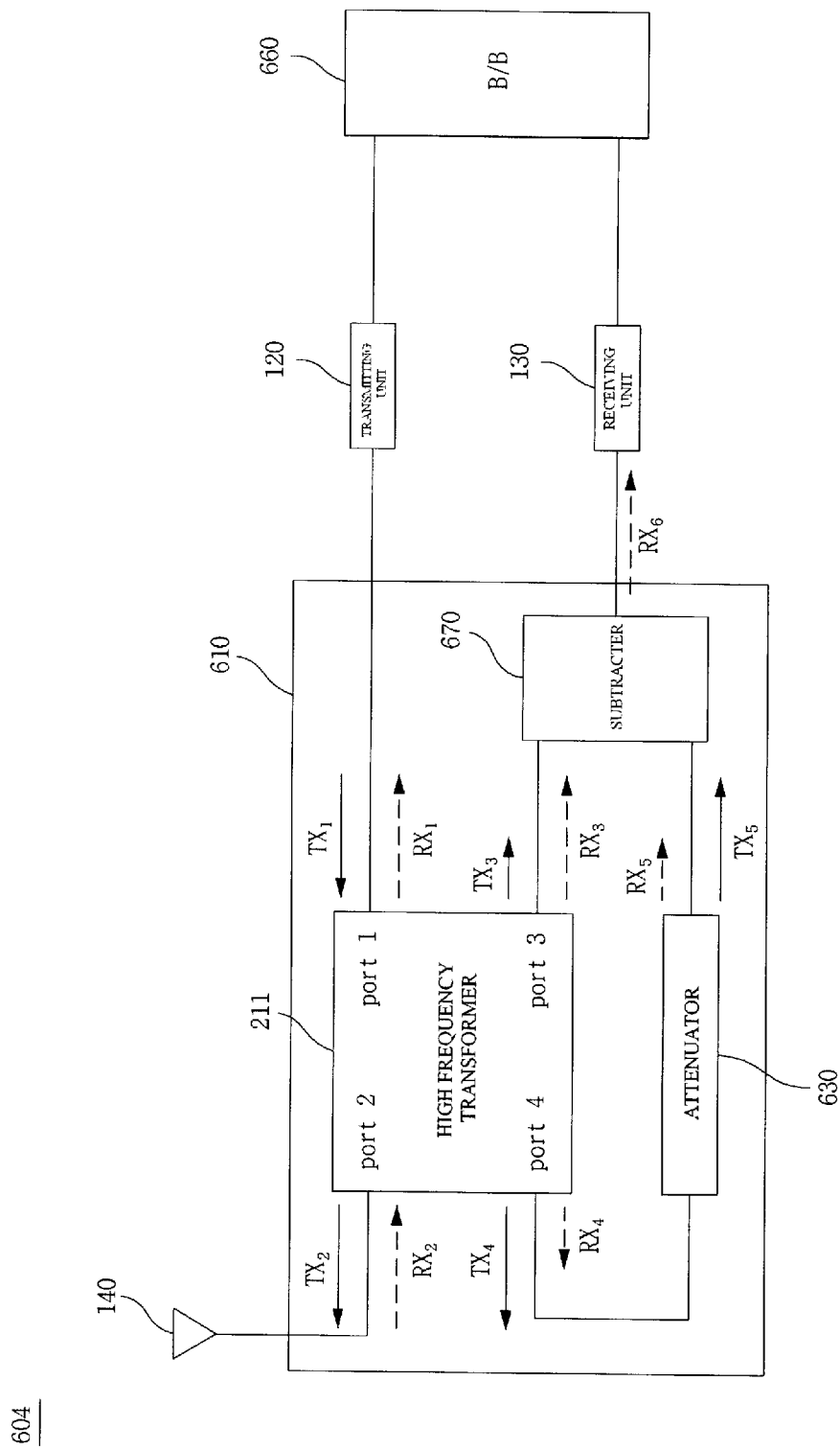
FIG. 12 is a block diagram illustrating an RF transmitting unit with a coupling apparatus using a high frequency transformer in place of a directional coupler being an example of the four-port circuit in accordance with an embodiment of the present invention.

FIG. 12 is a block diagram illustrating an RF transmitting unit 604 with a coupling apparatus 610 using a high frequency transformer 211 in place of a directional coupler 210 being an example of the four-port circuit 500 in accordance with an embodiment of the present invention.

The coupling apparatus 610 of FIG. 12 includes a high frequency transformer 211, an attenuator 630, and a subtracter 670. The high frequency transformer 211 includes four ports, namely, port 1, port 2, port 3, and port 4. The relationship between respective ports is the same as in FIG. 5. Since port 1 and port 2 form a through path, when a transmitting signal $TX_1$ from the transmitting unit 120 is input to port 1, a signal $TX_2$ attenuated due to an insertion loss is output to port 2 (equation 1). Since port 1 and port 4 are coupled with each other, when a transmitting signal $TX_1$ from the transmitting unit 120 is input to port 1, a coupled signal $TX_4$ is output to port 4 (equation 2). Since port 1 and port 4 form an isolation path, a leakage signal $TX_3$ of the transmitting signal $TX_1$ input to port 1 from the transmitting unit 120 is output to port 3 (equation 3). Further, the high frequency transformer 211 of the present invention has reciprocity with respect to respective ports.

Port 2 of the high frequency transformer 211 is connected to an antenna 140, port 4 thereof is connected to an attenuator 630, and port 1 thereof is connected to a transmitting unit 120. An output of port 3 and an output of the attenuator 630 are provided to a substractor 670. The subtracter 670 provides a subtracted output to a receiving unit 130.

The RF transceiver 604 of FIG. 12 using the high frequency transformer 211 as an example of the four-port circuit 500 is identical with the RF transceiver 601 of FIG. 6, and thus the detailed description thereof is omitted.

The four-port circuit described in the embodiment of the present invention prior to the modified example 1 is a directional coupler 210. However, although the high frequency transformer 211 is substituted for the directional coupler 210, the same objects and effects can be attained. Since the high frequency transformer 211 having the foregoing relationship between respective ports is well known to those skilled in the art, a detailed description thereof will be omitted. As all the remaining structural elements except for the high frequency transformer 211, the antenna 140, the attenuator 630, the subtracter 670, the receiving unit 130, the transmitting unit 130, and the baseband unit 660 are identical with those of the first embodiment with the directional coupler, and thus a detailed description thereof is omitted.

Embodiment 2

Adaptive Change of Attenuation Value

Figure 13:
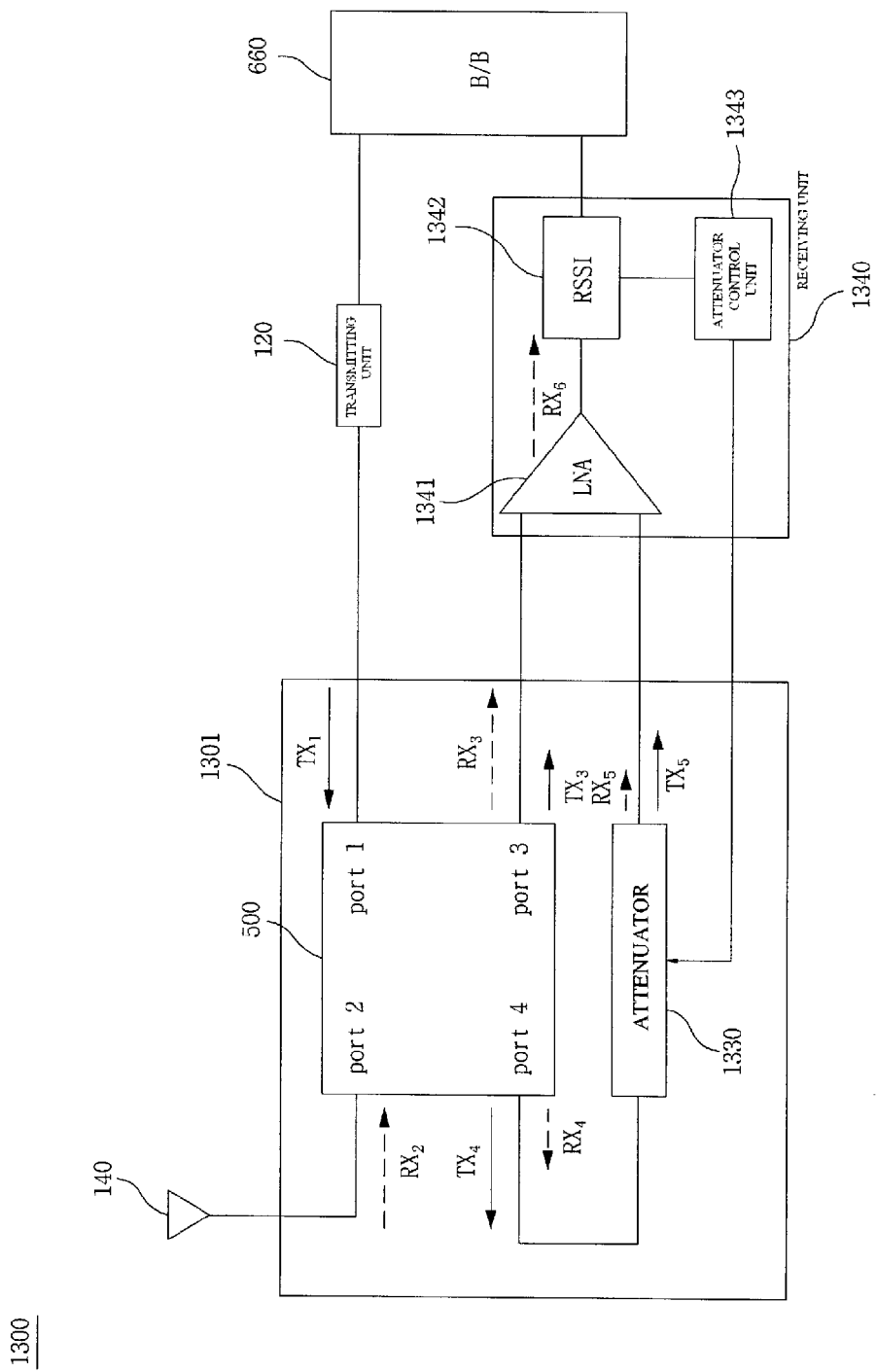
FIG. 13 is a block diagram illustrating an RF transceiver using a variable attenuator capable of variably controlling an attenuation value of an attenuator in accordance with an embodiment of the present invention.

FIG. 13 is a block diagram illustrating an RF transceiver 1300 using a variable attenuator 1330 capable of variably controlling an attenuation value of an attenuator in accordance with an embodiment of the present invention.

Figure 14:
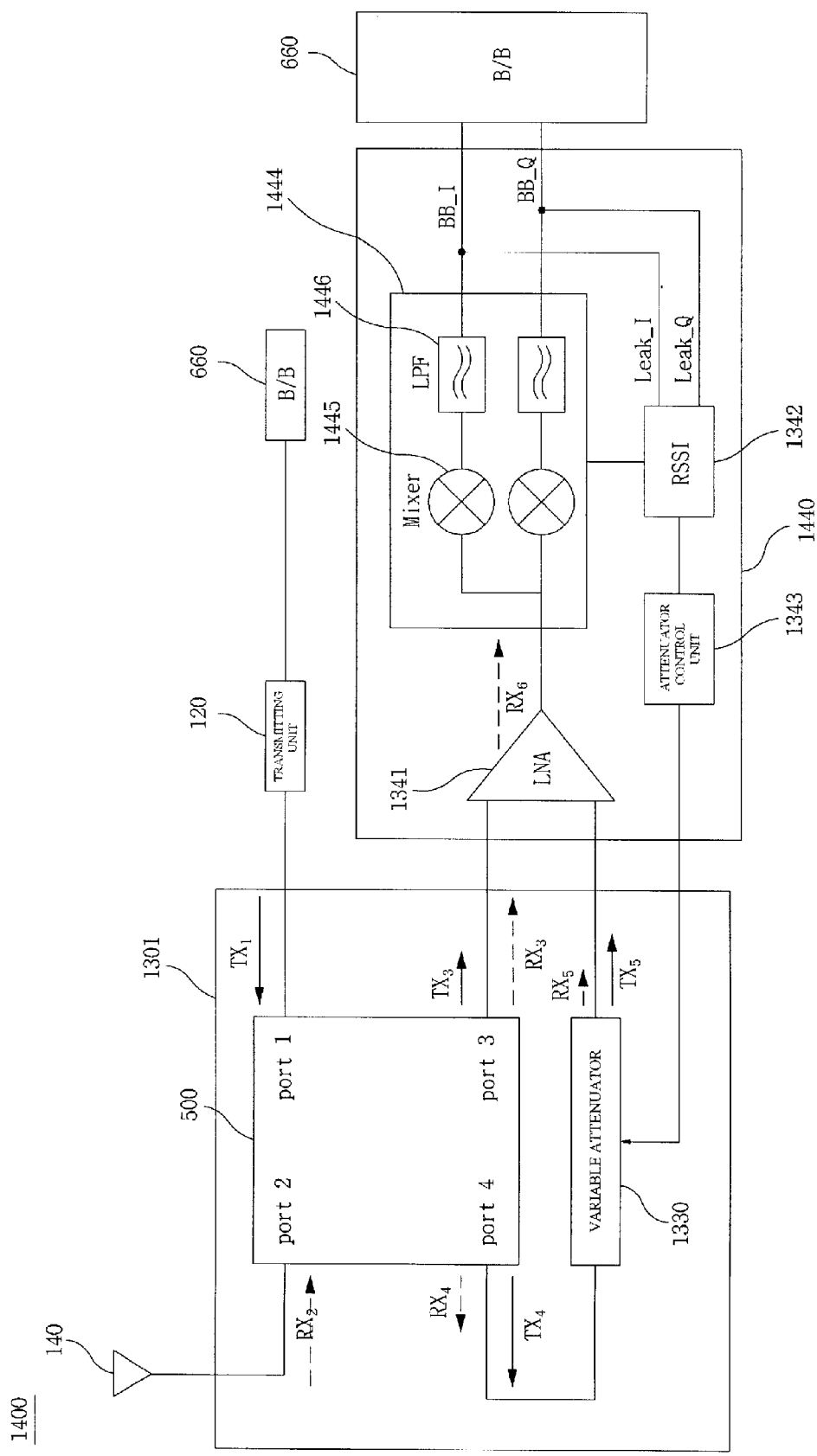
FIG. 14 is a block diagram illustrating an RF transceiver using a variable attenuator capable of variably controlling an attenuation value of an attenuator in accordance with another embodiment of the present invention.

FIG. 14 is a block diagram illustrating an RF transceiver 1400 using a variable attenuator 1330 capable of variably controlling an attenuation value of an attenuator in accordance with another embodiment of the present invention.

Upon a usage of the variable attenuator 1330, although characteristics of the four-port circuit 500 or other components such as a PCB are changed, a desired isolation performance can be achieved. The RF receiving unit 1300 of FIG. 13 includes an antenna 140 transmitting and receiving an RF signal, a transmitting unit 120 converting a baseband signal into an RF transmitting signal $TX_1$, a coupling apparatus 1301, a receiving unit 1340 receiving an output of the coupling apparatus 1301 as an input signal and converting it into the baseband signal, and a baseband unit 660 processing the baseband signal. The RF receiving unit 1400 of FIG. 14 includes an antenna 140 transmitting and receiving an RF signal, a transmitting unit 120 converting a baseband signal into an RF transmitting signal $TX_1$, a coupling apparatus 1301, a receiving unit 1440 receiving an output of the coupling apparatus 1301 as an input signal and converting it into the baseband signal, and a baseband unit 660 processing the baseband signal. The coupling apparatus 1301 includes a four-port circuit 500 and a variable attenuator 1330 capable of variably controlling an attenuation value. The receiving unit 1340 of FIG. 13 and the receiving unit 1440 of FIG. 14 each includes a low-noise amplifier 1341 subtracting and amplifying an input signal, a received signal strength indication (RSSI) measuring unit 1342 measuring an RSSI of a transmission leakage signal, and an attenuator control unit 1343 controlling an attenuation value of a variable attenuator 1330 based on the measured RSSI in common.

The following is a description of a difference between the RF transceiver 1300 of FIG. 13 and the RF transceiver 140 of FIG. 14.

Embodiment 2-1

The RF transceiver 1300 of FIG. 13 includes the transmitting unit 120, the receiving unit 1340, the coupling apparatus 1301, the antenna 140, and the baseband unit 660.

The coupling apparatus 1301 includes a four-port circuit 500 and a variable attenuator 1330 capable of variably controlling an attenuation value.

The receiving unit 1340 includes a low-noise amplifier 1341, an RSSI measuring unit 1342, and an attenuator control unit 1343 controlling an attenuation value of a variable attenuator 1330 based on the measured RSSI.

A transmitting signal $TX_1$ provided to the transmitting unit 120 is input to port 1 of the four-port circuit 500, the antenna 140 is connected to port 2 thereof, and port 4 thereof is connected to an input terminal of the variable attenuator 1330. The low-noise amplifier 1341 included in the receiving unit 1340 substracts and amplifies outputs $RX_3$ and $TX_3$ of the port 3, and outputs $RX_5$ and $TX_5$ of the variable attenuator 1330. The RSSI measuring unit 1342 measures an RSSI of a transmission leakage signal based on an output $RX_6$ of the low-noise amplifier 1341, and transfers the measured RSSI to the attenuator control unit 1343. The attenuator control unit 1343 controls an attenuation value of the variable attenuator 1330 to have the lowest RSSI based on the measured RSSI such that an isolation effect of the transmitting signal can be maximized.

Embodiment 2-2

The RF transceiver 1400 shown in FIG. 14 includes the coupling apparatus 1301, the antenna 140, the transmitting unit 120, the receiving unit 1440, and the baseband unit 660.

The coupling apparatus 1301 includes a four-port circuit 500 and a variable attenuator 1330 capable of variably controlling an attenuation value.

The receiving unit 1440 includes a low-noise amplifier 1341, an RSSI measuring unit 1342, a baseband converter 1444, and an attenuator control unit 1343 controlling an attenuation value of a variable attenuator 1330 based on the measured RSSI.

A transmitting signal $TX_1$ provided to the transmitting unit 120 is input to port 1 of the four-port circuit 500, the antenna 140 is connected to port 2 thereof, and port 4 thereof is connected to an input terminal of the variable attenuator 1330. The low-noise amplifier 1341 included in the receiving unit 1340 substracts and amplifies outputs $RX_3$ and $TX_3$ of port 3, and outputs $RX_5$ and $TX_5$ of the variable attenuator 1330. The subtracted and amplified output of the low-noise amplifier 1341 is provided to the baseband converter 1444.

Unlike the RF transmitting unit 1300 of FIG. 13, in the RF transmitting unit 1400 of FIG. 14, the baseband converter 1444 is additionally included in the receiving unit 1440. The baseband converter 1444 is connected between the low-noise amplifier 1341 and the RSSI measuring unit 1342, receives an output signal $RX_6$ of the low-noise amplifier 1341, provides output signals BB_I and BB_Q to the baseband unit 660, and provides output signals Leak_I and Leak_Q to the RSSI measuring unit 1342. The baseband converter 1444 includes mixers 1445 and low pass filters 1446.

The RSSI measuring unit 1342 measures RSSIs of the signals Leak_I and Leak_Q output from the baseband converter 1444, and transfers the measured RSSIs to the attenuator control unit 1343. The attenuator control unit 1343 controls an attenuation value of the variable attenuator 1330 to have the lowest RSSI based on the measured RSSI such that an isolation effect of the transmitting signal can be maximized.

Figure 15:
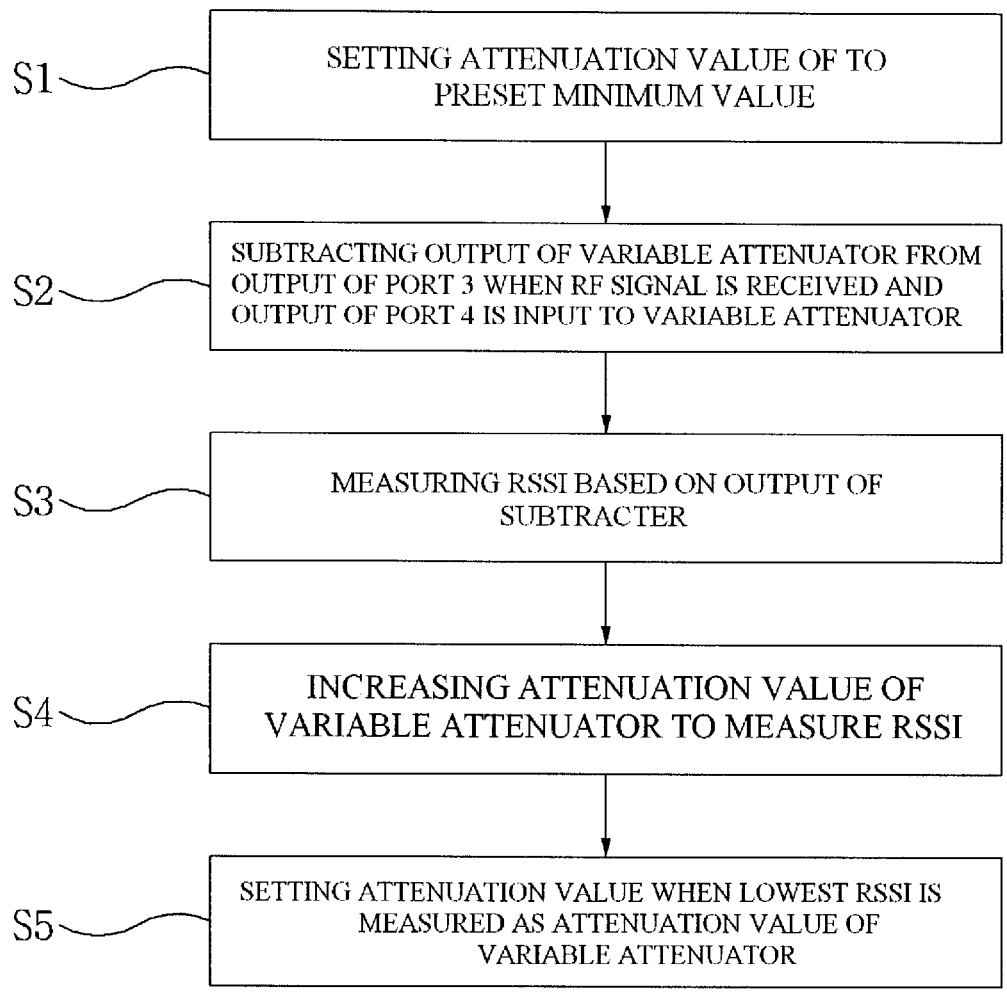
FIG. 15 is a flow chart illustrating a method for searching for an attenuation value of a variable attenuator maximizing an isolation effect of a transmitting signal performed by an RF transceiver in accordance with an embodiment of the present invention.

FIG. 15 is a flow chart illustrating a method for searching for an attenuation value of a variable attenuator 1330 maximizing an isolation effect of a transmitting signal performed by an RF transceiver 1300 in accordance with an embodiment of the present invention.

First, an attenuation value of a variable attenuator 1330 is set to a preset minimum value (S1).

Next, when an RF signal is received, and an output signal of port 4 is input to a variable attenuator 1330, a subtracter 670 subtracts an output of the variable attenuator 1330 from an output of port 3, and a subtracted signal of the substractor 670 is output (S2).

Then, an RSSI of a transmission leakage signal is measured based on an output of the subtracter 670 (S3).

Subsequently, while an attenuation value of the variable attenuator 1330 is sequentially increased, the RSSIs are measured (S4).

When the lowest RSSI among the measured RSSI values is measured, the attenuation value is set as the attenuation value of the variable attenuator 1330 (S5).

The suggested new coupling apparatus is not limited to the above-mentioned embodiments, but is capable of dividing all wireless communication systems transmitting and receiving a signal using one shared antenna capable of separating a leakage signal of a transmitting signal from a received signal.

Although embodiments in accordance with the present invention have been described in detail hereinabove, it should be understood that many variations and modifications of the basic inventive concept herein described, which may appear to; those skilled in the art, will still fall within the spirit and scope of the exemplary embodiments of the present invention as defined in the appended claims.

What is claimed is:

1. A transceiver comprising a transmitting unit, a receiving unit, and a coupling apparatus for dividing a radio frequency (RF) transmitting signal and an RF receiving signal in the transceiver with the transmitting unit and the receiving unit sharing an antenna, comprising:

a four-port circuit having port 1, port 2, port 3, and port 4, a through path being formed between the port 1 and the port 2, a first signal input to the port 1 being coupled to the port 4, a second signal input to the port 2 being coupled to the port 3, and an isolation path being formed between the port 1 and the port 3 and between the port 2 and the port 4; and an attenuator attenuating and outputting a signal output from the port 4 of the four-port circuit, wherein the RF transmitting signal is input to the port 1 of the four-port circuit, the RF receiving signal is input to the port 2 of the four-port circuit, and outputs of the attenuator and the port 3 of the four-port circuit are provided the receiving unit;

wherein the attenuator is a variable attenuator operable to control variably an attenuation value, and the receiving unit includes:

a low-noise amplifier subtracting and amplifying an output signal of the attenuator from an output signal of the port 3 of the four-port circuit;

a received signal strength indicator (RSSI) measuring unit measuring an RSSI of a transmission leakage signal based on an output of the low-noise amplifier; and a control unit controlling an attenuation value of the attenuator based on the measured RSSI.

2. The transceiver according to claim 1, further comprising an antenna connected to the port 2 of the coupling apparatus.

3. The transceiver apparatus according to claim 1, wherein the four-port circuit is a directional coupler or a high frequency transformer.

4. The transceiver apparatus according to claim 2, wherein the four-port circuit is a directional coupler or a high frequency transformer.

5. A method for controlling the attenuation value of the variable attenuator by a controller of the transceiver according to claim 1 comprising the steps of:
  setting the attenuation value of the variable attenuator to a predetermined minimum value;
  subtracting an output of the variable attenuator from an output of the port 3 by a subtracter when an RF signal is received and an output signal of the port 4 is input to the variable attenuator;
  measuring an RSSI of a transmission leakage signal based on an output of the subtracter;
  sequentially increasing an attenuation value of the variable attenuator to measure the RSSIs; and
  setting the attenuation value achieved when the lowest RSSI among the measured RSSI values is measured set as the attenuation value of the variable attenuator.

6. A transceiver comprising a transmitting unit, a receiving unit, and a coupling apparatus for dividing a radio frequency (RF) transmitting signal and an RF receiving signal in the transceiver with the transmitting unit and the receiving unit sharing an antenna, comprising:
  a four-port circuit having port 1, port 2, port 3, and port 4, a through path being formed between the port 1 and the port 2, a first signal input to the port 1 being coupled to the port 4, a second signal input to the port 2 being coupled to the port 3, and an isolation path being formed between the port 1 and the port 3 and between the port 2 and the port 4; and
  an attenuator attenuating and outputting a signal output from the port 4 of the four-port circuit,
  wherein the RF transmitting signal is input to the port 1 of the four-port circuit, the RF receiving signal is input to the port 2 of the four-port circuit, and outputs of the attenuator and the port 3 of the four-port circuit are provided the receiving unit;
  a subtracter subtracting an output signal of the attenuator from an output signal of the port 3, wherein an output of the subtracter is provided to the receiving unit;
  wherein the attenuator is a variable attenuator operable to control variably an attenuation value, and the subtracter subtracts an output signal of the attenuator from an output signal of the port 3, and the receiving unit includes:
  a received signal strength indicator (RSSI) measuring unit measuring an RSSI of a transmission leakage signal based on an output of the subtracter; and
  a control unit controlling an attenuation value of the attenuator based on the measured RSSI.

7. The transceiver according to claim 6, further comprising an antenna connected to the port 2 of the coupling apparatus.

8. The transceiver apparatus according to claim 6, wherein the four-port circuit is a directional coupler or a high frequency transformer.

9. The transceiver apparatus according to claim 7, wherein the four-port circuit is a directional coupler or a high frequency transformer.

10. A method for controlling the attenuation value of the variable attenuator by a controller of the transceiver according to claim 6 comprising the steps of:
  setting the attenuation value of the variable attenuator to a predetermined minimum value;
  subtracting the output of the variable attenuator from the output of the port 3 by the subtracter when an RF signal is received and an output signal of the port 4 is input to the variable attenuator;
  measuring an RSSI of a transmission leakage signal based on an output of the subtracter;
  sequentially increasing an attenuation value of the variable attenuator to measure the RSSIs; and
  setting the attenuation value achieved when the lowest RSSI amen the measured RSSI values is measured set as the attenuation value of the variable attenuator.

11. A transceiver comprising a transmitting unit, a receiving unit, and a coupling apparatus for dividing a radio frequency (RF) transmitting signal and an RF receiving signal in the transceiver with the transmitting unit and the receiving unit sharing an antenna, comprising:
  a four-port circuit having port 1, port 2, port 3, and port 4, a through path being formed between the port 1 and the port 2, a first signal input to the port 1 being coupled to the port 4, a second signal input to the port 2 being coupled to the port 3, and an isolation path being formed between the port 1 and the port 3 and between the port 2 and the port 4; and
  an attenuator attenuating and outputting a signal output from the port 4 of the four-port circuit,
  wherein the RF transmitting signal is input to the port 1 of the four-port circuit the RF receiving signal is input to the port 2 of the four-port circuit, and outputs of the attenuator and the port 3 of the four-port circuit are provided the receiving unit;
  wherein the attenuator is a variable attenuator operable to control variably an attenuation value, and the receiving unit includes:
  a low-noise amplifier subtracting and amplifying an output signal of the attenuator from an output signal of the port 3 of the four-port circuit;
  a mixer down-converting an output signal of the low-noise amplifier;
  a low pass filter passing low frequency components included in an output of the mixer;
  a received signal strength indicator (RSSI) measuring unit measuring an RSSI of a transmission leakage signal based on an output of the low pass filter; and
  a control unit controlling an attenuation value of the attenuator based on the measured RSSI.

12. The transceiver according to claim 11, further comprising an antenna connected to the port 2 of the coupling apparatus.

13. The transceiver apparatus according to claim 11, wherein the four-port circuit is a directional coupler or a high frequency transformer.

14. The transceiver apparatus according to claim 12, wherein the four-port circuit is a directional coupler or a high frequency transformer.

15. A method for controlling the attenuation value of the variable attenuator by a controller of the transceiver according to claim 11 comprising the steps of:
  setting the attenuation value of the variable attenuator to a predetermined minimum value;
  subtracting an output of the variable attenuator from an output of the port 3 by a subtracter when an RF signal is received and an output signal of the port 4 is input to the variable attenuator;
  measuring an RSSI of a transmission leakage signal based on an output of the subtracter;
  sequentially increasing an attenuation value of the variable attenuator to measure the RSSIs; and
  setting the attenuation value achieved when the lowest RSSI among the measured RSSI values is measured set as the attenuation value of the variable attenuator.

* * * * *